(12) United States Patent
Yang et al.

(10) Patent No.: US 7,436,653 B2
(45) Date of Patent: Oct. 14, 2008

(54) HOUSING MECHANISM FOR ELECTRONIC DEVICE AND METHOD FOR MAKING THE SAME

(75) Inventors: Qing Yang, Shenzhen (CN); Chia-Hua Chen, Taipei Hsien (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/610,086

(22) Filed: Dec. 13, 2006

(65) Prior Publication Data

US 2007/0171603 A1    Jul. 26, 2007

(30) Foreign Application Priority Data

Jan. 20, 2006  (TW) ................... 95102386

(51) Int. Cl.
*H05K 7/12* (2006.01)
(52) U.S. Cl. .................... 361/679; 455/575.1

(58) Field of Classification Search ............... 361/679, 361/683
See application file for complete search history.

(56) References Cited

U.S. PATENT DOCUMENTS

| | | | | |
|---|---|---|---|---|
| 4,225,970 A | * | 9/1980 | Jaramillo et al. | ........... 455/90.3 |
| 5,253,495 A | * | 10/1993 | Zimmer | ........................ 68/43 |
| 5,422,766 A | * | 6/1995 | Hack et al. | .............. 360/97.02 |
| 6,193,089 B1 | * | 2/2001 | Yu | ............................ 220/4.21 |
| 6,904,300 B1 | * | 6/2005 | Maattanen et al. | ....... 455/575.1 |
| 6,983,130 B2 | * | 1/2006 | Chien et al. | ................ 455/90.3 |

* cited by examiner

*Primary Examiner*—Ingrid Wright
(74) *Attorney, Agent, or Firm*—Steven M. Reiss

(57) ABSTRACT

An exemplary housing mechanism (100) for an electronic device includes a front cover (10), a back cover (20), and an elastic sealing element (12). The front cover has a projecting edge (18) defined thereon. The back cover has a recessed edge (26) defined therein. The elastic sealing element has a tip portion (122) and is formed or sealed together with the front cover. The projecting edge of the front cover and the tip portion of the elastic sealing element are configured to be press fit into the recessed edge of the back cover.

7 Claims, 5 Drawing Sheets

HOUSING MECHANISM FOR ELECTRONIC DEVICE AND METHOD FOR MAKING THE SAME

BACKGROUND OF THE INVENTION

1. Field of the Invention

The present invention generally relates to electronic devices and, more particularly, to a housing mechanism for an electronic device and a method for making the same.

2. Description of Related Art

With the development of wireless communication and information processing technologies, portable electronic devices such as notebook computers, mobile phones, and personal digital assistants (PDAs) are now in widespread use. These electronic devices enable consumers to enjoy high technology services anytime and anywhere.

Most contemporary electronic devices have little protection against water, dust, and/or other contaminants. If the electronic devices drop into water, the electronic devices cannot be used because water may erode electronic elements of the electronic devices and/or cause short circuits. Some electronic devices have rubber plugs to protect against water or dust. However, the rubber plugs are easily lost or fall out, as they tend to be small and/or not well anchored.

Therefore, a new housing mechanism for an electronic device is desired in order to overcome the above-described shortcomings.

SUMMARY OF THE INVENTION

In one aspect, a housing mechanism for an electronic device includes a front cover, a back cover, and an elastic sealing element. The front cover has a projecting edge defined therein. The back cover has a sunken/recessed edge defined therein. The elastic sealing element has a tip portion formed thereon, the tip portion being operatively associated with the projecting edge of the front cover. The projecting edge of the front cover and the tip portion of the elastic sealing element are configured (i.e., structured and arranged) to be pressed together into the sunken edge of the back cover.

In another aspect, a method for making a housing mechanism for an electronic device is provided. Firstly, a front cover, an elastic sealing element, and a back cover are provided. The front cover has a projecting edge, and the elastic sealing element is either integrally formed on the front cover or sealingly attached (e.g., via an adhesive) thereto, and the elastic sealing element has a tip portion. The back cover has a sunken/recessed edge. The projecting edge of the front cover and the tip portion of the elastic sealing element are both pressed into the sunken edge of the back cover, thereby forming a sealed connection between the front cover and the back cover.

Other advantages and novel features will become more apparent from the following detailed description when taken in conjunction with the accompanying drawings.

BRIEF DESCRIPTION OF THE DRAWINGS

Many aspects of the housing mechanism can be better understood with reference to the following drawings. The components in the drawings are not necessarily drawn to scale, the emphasis instead being placed upon clearly illustrating the principles of the present housing mechanism. Moreover, in the drawings, like reference numerals designate corresponding parts throughout the several views.

DETAILED DESCRIPTION OF THE INVENTION

Figure 1:
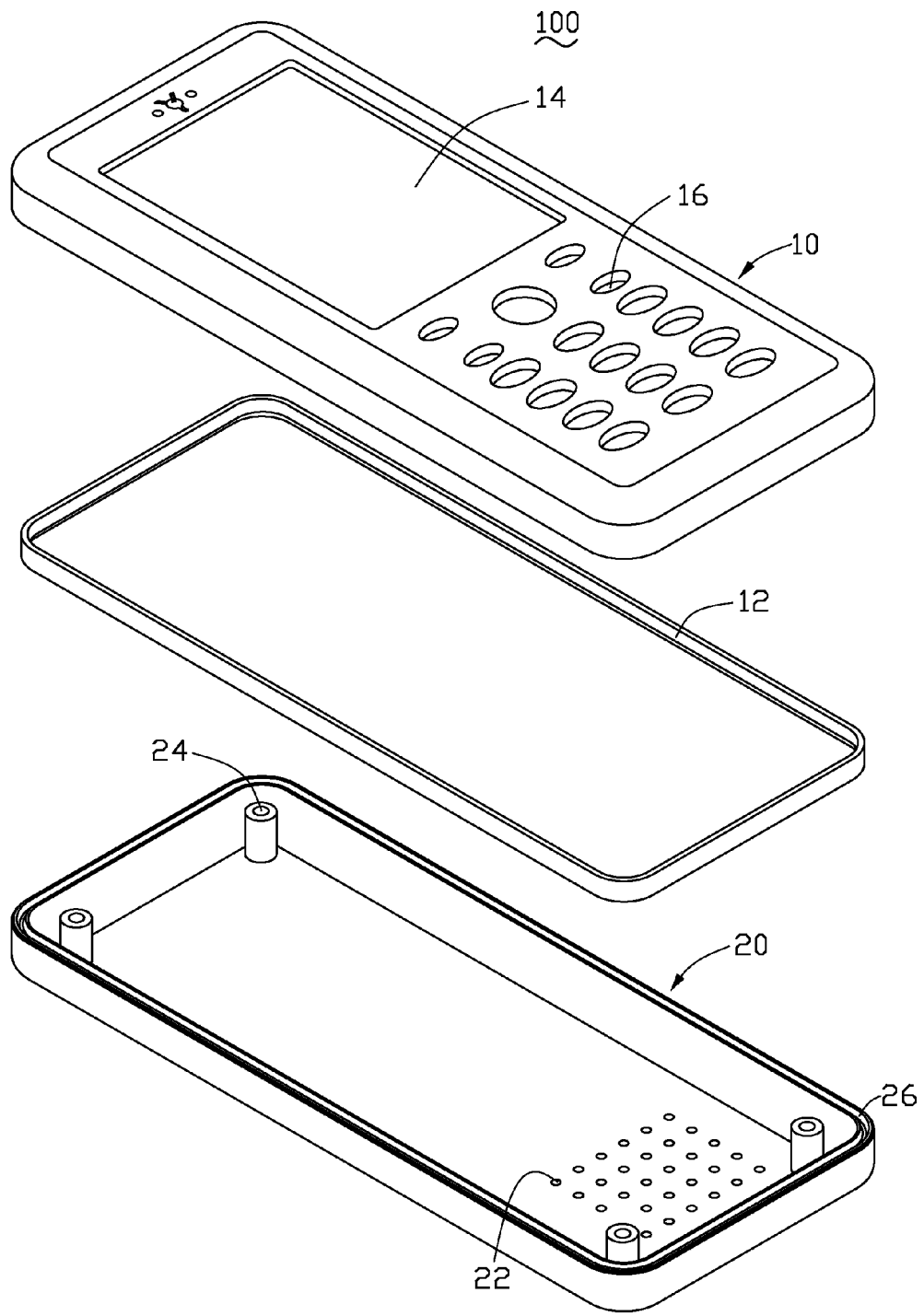
FIG. 1 is an exploded, schematic view of a housing mechanism, in accordance with a preferred embodiment.
Figure 2:
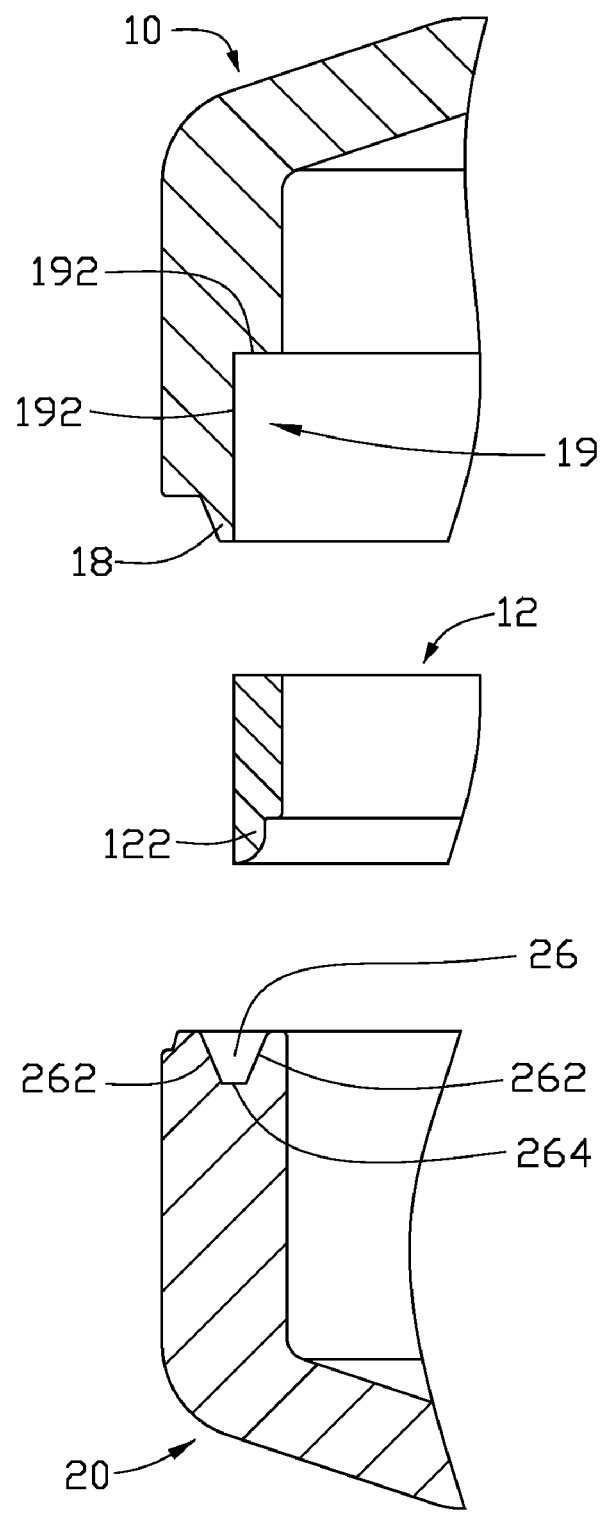
FIG. 2 is a partial, cross-sectional view of the housing mechanism in FIG. 1.

Referring to FIG. 1, in a preferred embodiment, a housing mechanism 100 includes a front cover 10, a back cover 20, and an elastic sealing element 12, integrally formed with the front cover 10 or sealingly attached thereto. For ease of description, FIG. 2 shows an exploded view of the housing 100, even though the front cover 10 and the elastic sealing element 12 are actually formed/sealed together.

The front cover 10 is essentially rectangular in shape. The front cover 10 includes a display opening 14 and a plurality of keypad openings 16. The display opening 14 is configured for containing a display of an electronic device. The keypad openings 16 are configured for containing a keypad of the electronic device. Referring to FIG. 2, the front cover 10 has a projecting edge 18 formed thereon. A concave portion 19 is formed on the front cover 10 adjacent to the projecting edge 18. The concave portion 19 faces the interior of the housing 100 and has two perpendicular surfaces 192. The projecting edge 18 includes one of the perpendicular surfaces 192 and an outwardly angled face, the projecting edge 18 thereby being narrowest at a distal end thereof and increasing in width away from that distal end.

The elastic sealing element 12 is an essentially quadrilateral, hollow element, in shape, and is advantageously formed of an elastomeric material. A tip portion 122 is formed at an edge of the elastic sealing element 12. The outer surface of the tip surface is even and contiguous with the remainder of the elastic sealing element 12, while the inner surface thereof is curved. The inner surface curves in a manner such that the tip portion 122 is narrowest at its distal end and widening therefrom. The elastic sealing element 12 is formed or sealed (e.g., adhered or plastically welded) on the concave portion 19 of the front cover 10, in contact with the perpendicular surfaces 192. The tip portion 122 of the elastic sealing element 12 is adjacent to the projecting edge 18 of the front cover 10.

The back cover 20 is essentially rectangular in shape, matching the shape of the front cover 10. The back cover 20 includes a plurality of sound holes 22 and a plurality (e.g., four, as shown) of screw holes 24 formed therein. The back cover 20 has a sunken/recessed/grooved edge 26 defined thereon. The grooved edge 26 has two side surfaces 262 and a bottom surface 264. A width of the projecting edge 18 plus a width of the tip portion 122 is slightly larger than that at an equivalent location within the grooved edge 26 of the back cover 20, and the projecting edge 18 and the tip portion 122 can be pressed into the grooved edge 26 of the back cover 20. Accordingly, a press fit between the combination of the projecting edge 18 and the tip portion 122 and the grooved edge 26 is made possible by the highly elastic nature of the elastic sealing element 12. The spring force stored by the elastic sealing element 12 as part of this press fit, in turn, helps to hold both the projecting edge 18 and the tip portion 122 within the grooved edge 26.

The front cover 10 and the back cover 20 are, preferably, made of a plastic material. The plastic material can be, for example, polyvinyl chloride, polyethylene terephthalate, acrylonitrile-butadiene-styrene, polycarbonate, polyimide, a liquid crystal polymer, polyetherimide, polyphenylene sulfide, polysulfone, polystyrene, glycol-modified polyester, polypropylene, or any desired combination thereof. The elastic sealing element 12 is, preferably, made of an elastic thermoplastic, such as thermoplastic urethanes (TPU). The elastic sealing element 12 can also be made, e.g., of a natural or synthetic rubber.

Figure 3:
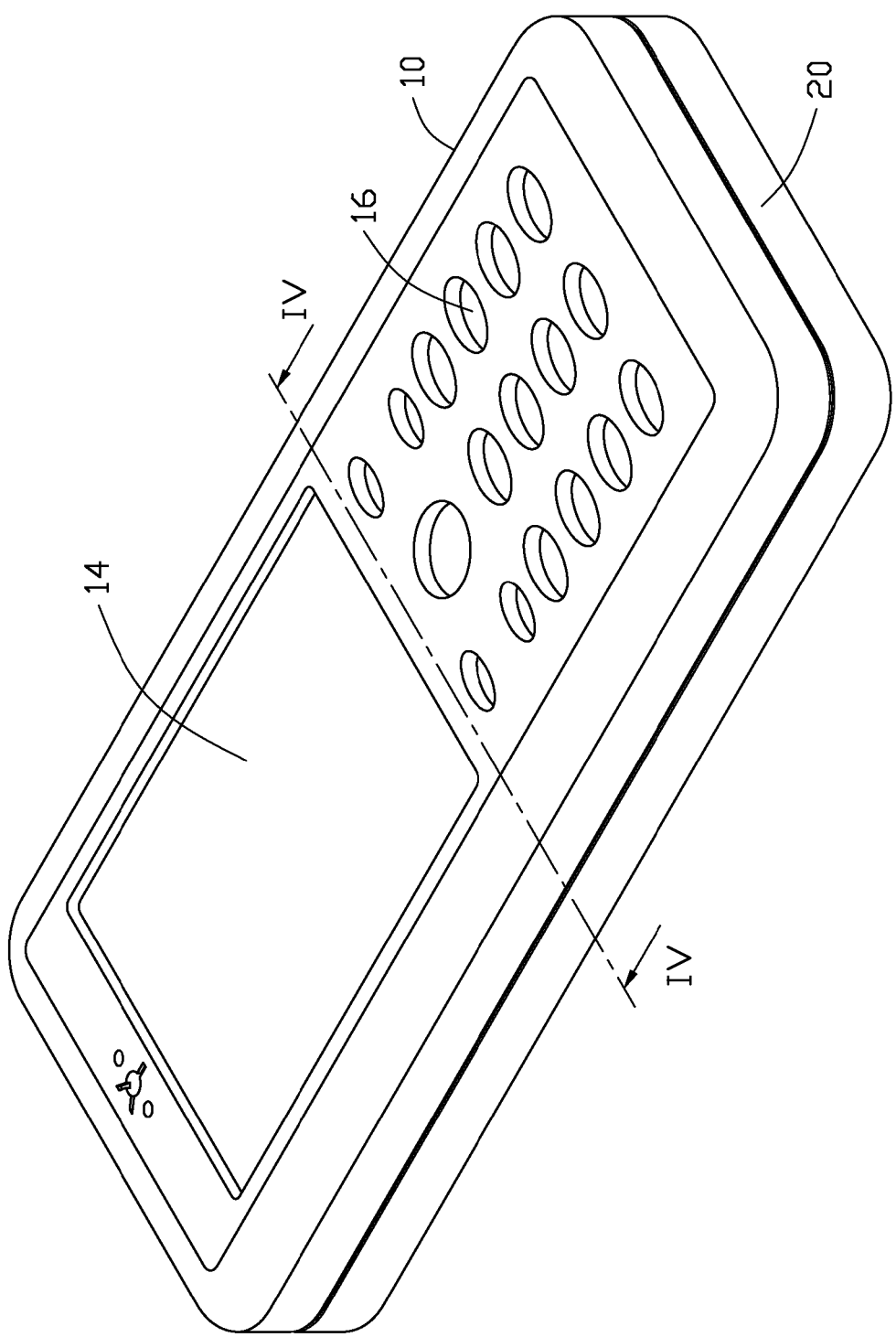
FIG. 3 is an assembled, schematic view of the housing mechanism of the preferred embodiment.
Figure 4:
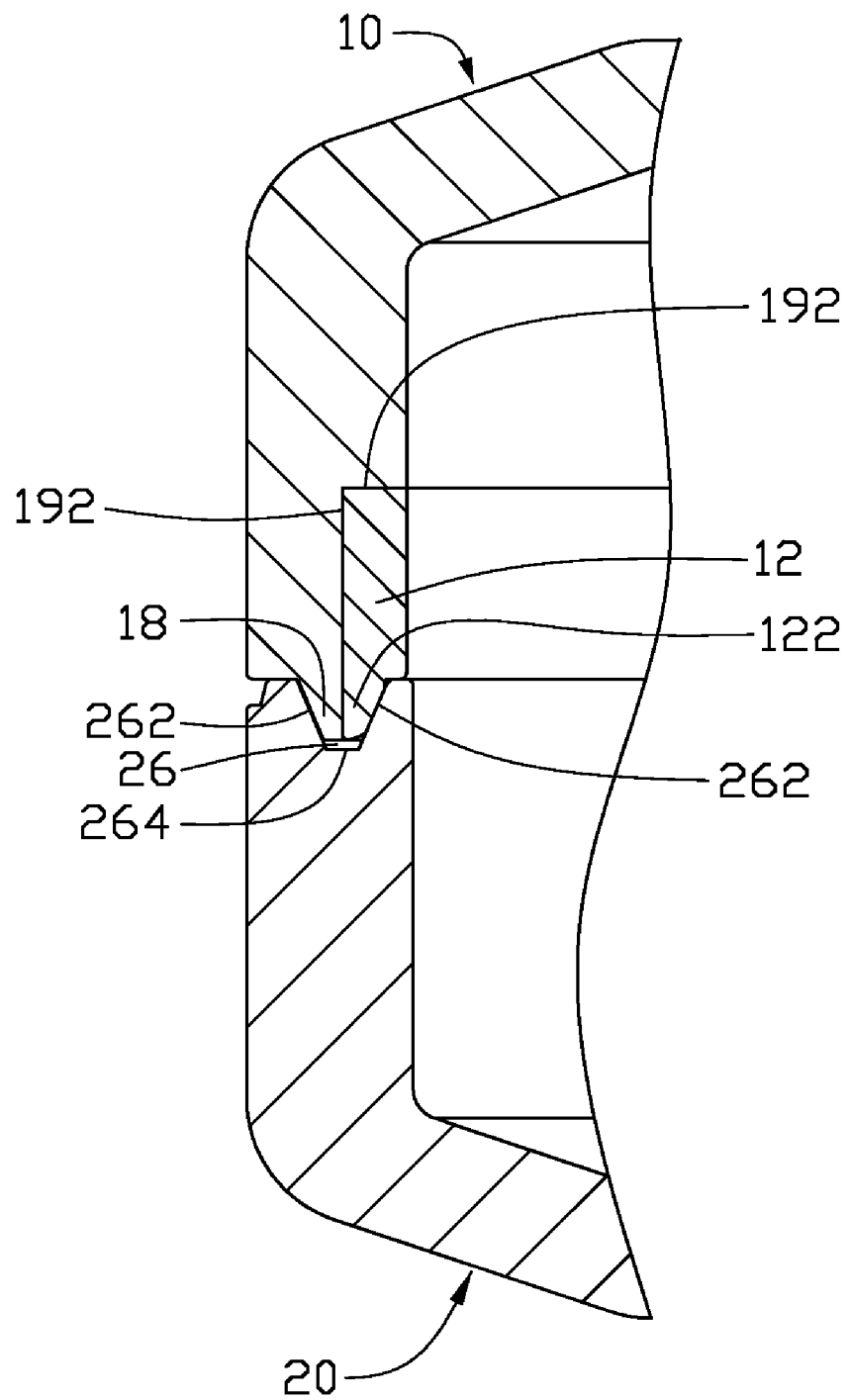
FIG. 4 is a partial, cross-sectional view of the present housing mechanism, as taken along line IV-IV in FIG. 3.
Figure 5:
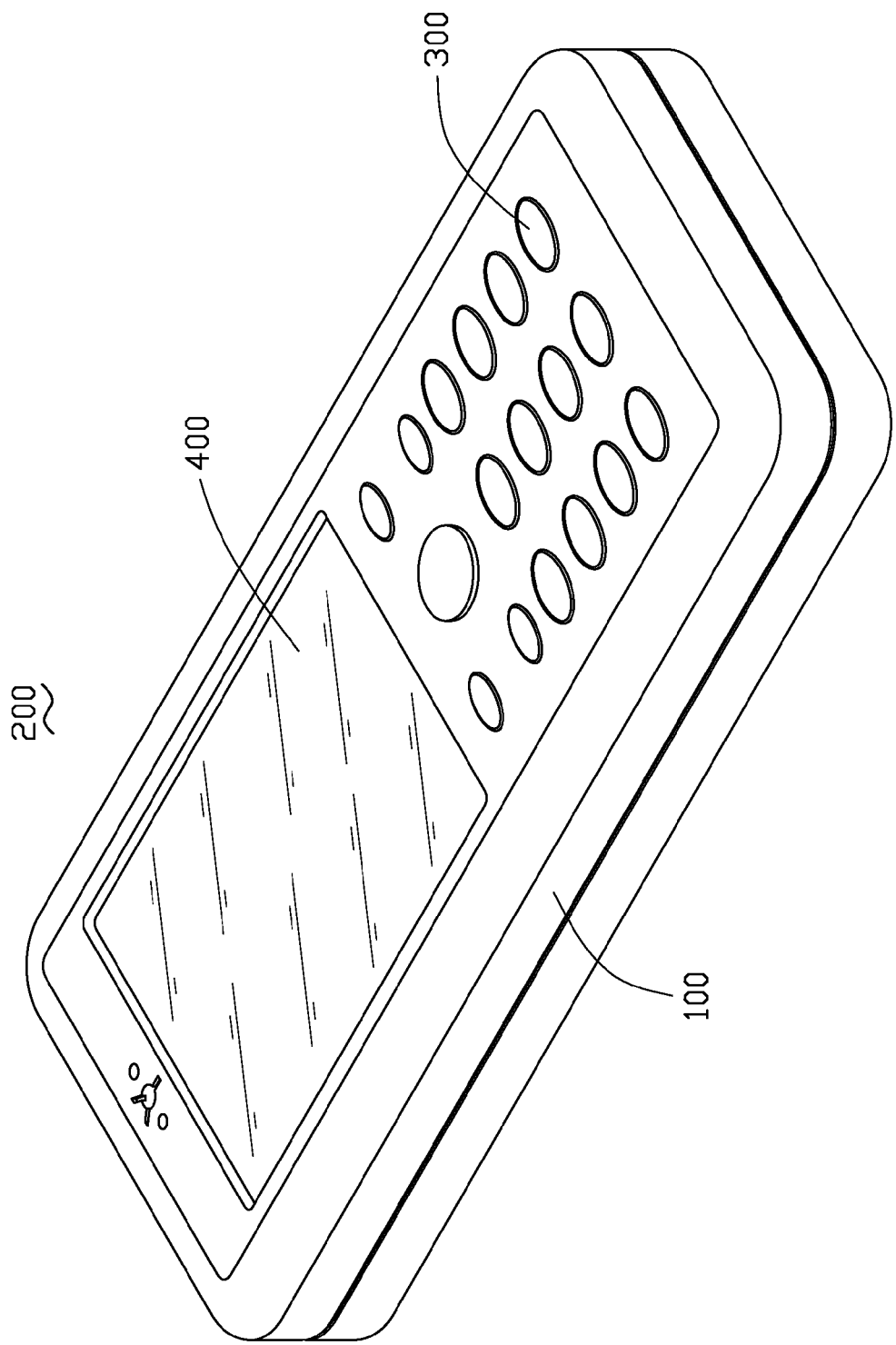
FIG. 5 is an isometric view of a portable electronic device incorporating the present housing mechanism.

Referring to FIGS. 3-4, in assembly, the projecting edge 18 and the tip portion 122 are pressed into the grooved edge 26 of the back cover 20 after internal elements of the electronic device are installed in the housing mechanism 100. Then, the front cover 10 and the back cover 20 are locked by means of screws, further holding the elastic sealing element 12 in place therebetween. Thus, the housing mechanism 100 is completely assembled. The elastic sealing element 12 can prevent water or dust from invading the housing mechanism 100. Referring to FIG. 5, the housing mechanism 100 can be used to as a housing of a portable electronic device 200, which further includes, e.g., a keypad 300 and a display 400 carried by the housing mechanism 100.

An exemplary method for making the housing mechanism 100 is provided. Firstly, a front cover 10 is molded in a first mold by injection molding. The front cover 10 has a projecting edge 18 and a concave portion 19 adjacent to the projecting edge 18. Secondly, an elastic sealing element 12 is molded on the concave portion 19 of the front cover 10 by injection molding. Thirdly, a back cover 20 is molded in another mold by injection molding. The front cover 10, the elastic sealing element 12, and the back cover 20 are mounted together, as described above, thus obtaining a housing mechanism 100 for an electronic device.

It is believed that the present embodiments and their advantages will be understood from the foregoing description, and it will be apparent that various changes may be made thereto without departing from the spirit and scope of the invention or sacrificing all of its material advantages, the examples here before described merely being preferred or exemplary embodiments of the invention.

What is claimed is:

1. A housing mechanism for an electronic device, comprising:
    a front cover having a projecting edge defined thereon and a concave portion adjacent to the projecting edge;
    a back cover having a grooved edge at least including two side surfaces defined therein; and
    an elastic sealing element having a tip portion, the elastic sealing element being formed together with and sealingly attached to the front cover, and positioned in the concave portion of the front cover such that the projecting edge and tip portion are adjacent each other;
    wherein the projecting edge of the front cover and the tip portion of the elastic sealing element are together configured to be press fit into the grooved edge of the back cover by:
    (a) the projecting edge of the front cover contacting one side surface of the grooved edge; and
    (b) the tip portion of the elastic sealing element contacting the other side surface of the grooved edge.

2. The housing mechanism as claimed in claim 1, wherein the grooved edge of the back cover has two side surfaces and a bottom surface.

3. The housing mechanism as claimed in claim 1, wherein the elastic sealing element is made of an elastomeric material.

4. The housing mechanism as claimed in claim 1, wherein the elastic sealing element is made of one of material chosen from the group consisting of rubber materials and thermoplastic urethanes (TPU).

5. The housing mechanism as claimed in claim 1, wherein a width of the projecting edge plus a width of the tip portion is slightly larger than that at an equivalent location within the grooved edge of the back cover.

6. The housing mechanism as claimed in claim 1, wherein the front cover and the back cover are made of a plastic material.

7. The housing mechanism as claimed in claim 1, wherein the front cover and the back cover are locked together by screws.

* * * * *